(12) United States Patent
Li et al.

(10) Patent No.: US 10,127,085 B2
(45) Date of Patent: Nov. 13, 2018

(54) METHOD AND SYSTEM FOR SCHEDULING TASK IN CLOUD COMPUTING

(71) Applicant: ZTE Corporation, Shenzhen (CN)

(72) Inventors: Mingli Li, Shenzhen (CN); Jianli Ren, Shenzhen (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 287 days.

(21) Appl. No.: 14/650,747

(22) PCT Filed: Oct. 14, 2013

(86) PCT No.: PCT/CN2013/085186
§ 371 (c)(1),
(2) Date: Jun. 9, 2015

(87) PCT Pub. No.: WO2014/090037
PCT Pub. Date: Jun. 19, 2014

(65) Prior Publication Data
US 2016/0292013 A1 Oct. 6, 2016

(30) Foreign Application Priority Data

Dec. 10, 2012 (CN) .......................... 2012 1 0527819

(51) Int. Cl.
G06F 9/46 (2006.01)
G06F 9/50 (2006.01)
(Continued)

(52) U.S. Cl.
CPC .......... *G06F 9/5083* (2013.01); *G06F 9/4881* (2013.01); *G06F 9/5066* (2013.01); *G06F 17/11* (2013.01)

(58) Field of Classification Search
CPC ...... G06F 17/11; G06F 9/4881; G06F 9/5066; G06F 9/5083
(Continued)

(56) References Cited

U.S. PATENT DOCUMENTS 8,631,154 B2 * 1/2014 Bartfai-Walcott ........................... H04L 47/2433
709/224
2004/0143560 A1 * 7/2004 Zhu ...................... G01C 21/343
706/19

(Continued)

FOREIGN PATENT DOCUMENTS

CN 101986272 A 3/2011
CN 102111337 A 6/2011

OTHER PUBLICATIONS

Peh, L. S., and A. L. Ananda. "The design and development of a distributed scheduler agent." Algorithms Architectures for Parallel Processing, 1996. ICAPP 96. 1996 IEEE Second International Conference on. IEEE, 1996. pp. 108-115.*

(Continued)

Primary Examiner — Meng Ai T An
Assistant Examiner — Willy W Huaracha
(74) Attorney, Agent, or Firm — Cantor Colburn LLP

(57) ABSTRACT

Disclosed are a method and a system for scheduling a task in cloud computing. The feature information of the task is parameterized; the task is classified; the best working node is obtained by computation through a Bacteria Foraging Optimization Algorithm (BFOA) according to the classification result; and the best working node is matched with the task. Obviously, the BFOA is adopted to implement task scheduling and resource allocation in cloud computing, so that the cloud computing has the advantages of group, intelligent and parallel search, simplicity in escaping from a local minimum and the like for the scheduling of a user task (Continued)

group, is favourable for keeping the diversity of the task group in the cloud computing, can meet the requirement of the user better, and improves the degree of satisfaction of user experience.

14 Claims, 5 Drawing Sheets

(51) Int. Cl.
G06F 9/48 (2006.01)
G06F 17/11 (2006.01)
(58) Field of Classification Search
USPC .......................................................... 718/104
See application file for complete search history.

(56) References Cited

U.S. PATENT DOCUMENTS

| 2005/0283786 | A1* | 12/2005 | Dettinger | ............... | G06Q 10/10 |
| | | | | | 718/104 |
| 2007/0110094 | A1* | 5/2007 | Tobita | ............... | G06F 9/4887 |
| | | | | | 370/453 |
| 2012/0324070 | A1* | 12/2012 | Campion | ............... | G06F 9/5066 |
| | | | | | 709/223 |
| 2016/0306673 | A1* | 10/2016 | You | ............... | G06F 9/5038 |
| 2018/0027058 | A1* | 1/2018 | Balle | ............... | H04L 67/1008 |

OTHER PUBLICATIONS

Wu, Chunguo, et al. "Improved bacterial foraging algorithms and their applications to job shop scheduling problems." International Conference on Adaptive and Natural Computing Algorithms. Springer Berlin Heidelberg, 2007. pp. 562-569.*
Nayak, Sasmita Kumari, Sasmita Kumari Padhy, and Siba Prasada Panigrahi. "A novel algorithm for dynamic task scheduling." Future Generation Computer Systems 28.5 (May 2012): 709-717.*
Dasgupta, Sambarta, et al. "Adaptive computational chemotaxis in bacterial foraging optimization: an analysis." IEEE Transactions on Evolutionary Computation 13.4 (2009): 919-941.*
Tawfeek et al. "Cloud task scheduling based on ant colony optimization". In Computer Engineering & Systems (ICCES), 2013 8th International Conference on (pp. 64-69). IEEE. (Year: 2013).*
International Search Report for corresponding application PCT/CN2013/085186 filed Oct. 14, 2013.

* cited by examiner

METHOD AND SYSTEM FOR SCHEDULING TASK IN CLOUD COMPUTING

TECHNICAL FIELD

The disclosure relates to the field of cloud computing, including e.g., a method and a system for scheduling a task in cloud computing.

BACKGROUND

The cloud computing is a commercial computing model in which infrastructure, a platform and software are provided. In the cloud computing, a computing task is distributed to a resource pool formed by a large number of computers, so that various application systems can acquire computing power, storage space and information service as required. The basic principle of the cloud computing is to split a large computation processing task into numerous small sub-tasks automatically through a network, send the sub-tasks to a large system formed by a plurality of servers to be searched, computed and analyzed, and finally return the processing result to a user, here, the network providing these resources is called "cloud". The service provided by the cloud computing faces a large number of users, so the task load in the "cloud" is also very large. Therefore, task scheduling and resource allocation are the key points and difficult points for determining the efficiency of the cloud computing. However, for the task scheduling in the cloud computing, there is still no good algorithm to meet the requirements of a user yet.

SUMMARY

The main technical problem to be solved by the disclosure is to provide a method and a system for scheduling a task in cloud computing, so as to meet the requirements of a user well.

To solve the problem, a method for scheduling a task in cloud computing is provided in the embodiment of the disclosure, comprising: parameterizing feature information of the task; classifying the task; making a computation through a Bacteria Foraging Optimization Algorithm (BFOA) according to a classification result to obtain a best working node; and executing the task by the best working node.

According to an embodiment of the disclosure, making the computation through the BFOA according to the classification result to obtain the best working node comprises: encoding the parameterized feature information of the task according to the classification result to obtain encoded feature information; selecting N working nodes to form an initial bacterial colony, wherein the N working nodes selected serve as bacterial individual i of the initial bacterial colony, where 1≤i≤N; decoding respectively the encoded feature information corresponding to each bacterial individual according to an algorithm decoder library; computing a fitness value of the each bacterial individual; performing a taxis operation on the each bacterial individual; performing a duplication operation on the each bacterial individual; performing a migration operation on the each bacterial individual; judging whether a best bacterial individual obtained currently reaches a user expectation value, based on that the best bacterial individual obtained currently reaches the user expectation value, selecting a working node corresponding to the best bacterial individual obtained currently as the best working node; based on that the best bacterial individual obtained currently does not reach the user expectation value, returning to a step of computing the fitness value of the each bacterial individual.

According to an embodiment of the disclosure, wherein in a process of performing the taxis operation on the each bacterial individual, the method further comprises: performing quorum sensing operation on the each bacterial individual.

According to an embodiment of the disclosure, wherein performing the quorum sensing operation on the each bacterial individual comprises: determining a bacterial individual sequence $I_{c\_best}$ which is currently in a best position in the bacterial colony, storing a position and a fitness value of each bacterial individual in the bacterial individual sequence; determining a bacterial individual sequence I to be searched for in the bacterial colony; selecting a serial number $J^{rand}$ in the $I_{c\_best}$; traversing the $I_{c\_best}$ to determine a position $P^J$ of the $J_{rand}$ in the $I_{c\_best}$; traversing each bacterial individual in the I to find an initial position of the $J^{rand}$ in the I, and replacing a serial number of the initial position of the $J^{rand}$ with the serial number of the $P^J$; comparing a current position of a current bacterial individual with a position of each bacterial individual in the $I_{c\_best}$ based on that the new current position of the current bacterial individual is better, updating the best bacterial individual to the current bacterial individual, and updating a best fitness value of the bacterial colony correspondingly; based on that the new current position of the current bacterial individual is not better, moving toward a position of the best bacterial individual in a next taxis operation.

According to an embodiment of the disclosure, wherein during performing the quorum sensing operation on the each bacterial individual, when the current bacterial individual is found in a standstill, reselecting a direction to search for the bacterial individual again; or, stopping searching for the current bacterial individual and performing a searching operation for a next bacterial individual.

According to an embodiment of the disclosure, wherein updating the best bacterial individual to the current bacterial individual, and updating the best fitness value of the bacterial colony correspondingly when the new position of the current bacterial individual is better comprises:
when $$J^i(j+1,k,l) > J_{best}(j,k,l)$$

$$\theta_{cc}^i(j+1,k,l) = \theta^i(j+1,k,l) + C_{cc} \times (\theta^b(j,k,l) - \theta^i(j,k,l))$$

where, $\theta_{cc}^i(j+1,k,l)$ is an updated position of the current bacterial individual i after the quorum sensing operation; $J^i(j+1,k,l)$ is a fitness value of the current bacterial individual i; $\theta^b(j,k,l)$ and $J_{best}(j,k,l)$ are a position and a fitness value of bacterial individual b in a best position in a current bacterial colony; and $C_{cc}$ is an attractive factor which determines a step at which the bacterial individual swims to a historical best position of the bacterial colony.

According to an embodiment of the disclosure, wherein moving toward the position of the best bacterial individual in the next taxis operation comprises:

$$V_{id}^{new} = \omega \cdot V_{id}^{old} + C_1 \cdot \phi_1 \cdot (\theta^b(j,k,l) - \theta_{i(d-1)}^{old}(j+1,k,l))$$

$$\theta_{id}^{new}(j+1,k,l) = \theta_{i(d-1)}^{old}(j+1,k,l) + V_{id}^{new}$$

where, $V^{id}_{new}$ represents a velocity of the current bacterial individual i after a dth taxis operation; w is an inertia weight, which enables a bacteria to keep movement inertia and a trend of expanding a search space; $V^{id}_{old}$ represents a velocity of the current bacterial individual i after a (d−1)th taxis operation; $C_1$ is an acceleration constant; $\varphi_1$ is a pseudo-random number uniformly distributed in an interval [0, 1]; $V_i$ is a velocity of the bacterial individual i; $\theta^b(j,k,l)$ is a position of bacterial individual b in a best position in the current bacterial colony; $\theta_{i(d-1)}^{old}(j+1,k,l)$ is a position of the current bacterial individual i after a (d−1)th taxis operation; and $\theta_{id}^{new}(j+1,k,l)$ is a position of the current bacterial individual i after a dth taxis operation.

According to an embodiment of the disclosure, wherein performing the taxis operation on the current bacterial individual i comprises:

$$\theta_i(j+1,k,l)=\theta_i(j,k,l)+C(i)\Phi(j)$$

where, $C_{(i)}>0$, representing a step at which a bacteria swims forwards;

$$\Phi(j) = \frac{\Delta(i)}{\sqrt{\Delta^T(i)\Delta(i)}},$$

wherein $\Delta(i)$ represents a rotating vector, which is a number in an interval [−1, 1].

According to an embodiment of the disclosure, wherein performing the taxis operation on a current bacterial individual i comprises:

$$\theta_i(j+1,k,l)=\theta_i(j,k,l)+C(k,l)\Phi(j)$$

where, $C(k,l)=L_{init}/n^{k+l-1}$, $C(k,l)$ represents a taxis operation step of the bacterial individual during a kth duplication operation and a lth migration operation; $L_{init}$ is an initial taxis step; n is a parameter for controlling a downward gradient of the step; and $$\Phi(j) = \frac{\Delta(i)}{\sqrt{\Delta^T(i)\Delta(i)}},$$

wherein $\Delta(i)$ represents a rotating vector, which is a number in an interval [−1, 1].

According to an embodiment of the disclosure, wherein computing the fitness value of a current bacterial individual i after the taxis operation is performed on the current bacterial individual i comprises:

$$J^i(j+1, k, l) = J^i(j, k, l) + J_{cc}(\theta^i(j+1, k, l), P(j+1, k, l))$$

$$J_{cc}(\theta, P(j, k, l)) =$$

$$\sum_{i=1}^{N} J_{cc}(\theta, \theta^i(j, k, l)) = \sum_{i=1}^{N}\left[-d_{attr}\exp\left(-w_{attr}\sum_{m=1}^{D}(\theta_m - \theta_m^i)^2\right)\right] +$$

$$\sum_{i=1}^{N}\left[h_{rep}\exp\left(-w_{rep}\sum_{m=1}^{D}(\theta_m - \theta_m^i)^2\right)\right]$$

$$P(j, k, l) = \{\theta^i(j, k, l) \mid i = 1, 2, \ldots S\}$$

where, $J^i(j,k,l)$ is a fitness value of a bacteria individual i after a jth taxis operation, a kth duplication operation and a lth migration operation; $J_{cc}(\theta^i(j+1,k,l),P(j+1,k,l))$ is an inter-individual sensitivity value of the bacteria individual i; $\theta^i(j+1,k,l)$ is an updated position of the bacteria individual i after a (d−1)th taxis operation; $P(j+1,k,l)$ is an individual position of the bacteria individual i in the bacterial colony after a (d−1)th taxis operation; $P(j,k,l)$ is an individual position of the bacteria individual i in the bacterial colony after a jth taxis operation; $d_{attr}$ and $w_{attr}$ represent a quantity and a releasing velocity of an attractive factor respectively; $h_{rep}$ and $w_{rep}$ represent a quantity and a releasing velocity of a repelling factor respectively;

$$\sum_{i=1}^{N}\left[-d_{attr}\exp\left(-w_{attr}\sum_{m=1}^{D}(\theta_m - \theta_m^i)^2\right)\right]$$

represents cybotaxis influence, on the bacterial colony, brought by a position where a ith bacterium individual locates;

$$\exp\left(-w_{attr}\sum_{m=1}^{D}(\theta_m - \theta_m^i)^2\right)$$

represents a coefficient of the cybotaxis influence, on the bacterial colony, brought by the position where the ith bacterium individual locates;

$$\sum_{m=1}^{D}(\theta_m - \theta_m^i)^2$$

represents a variance of the position where the ith bacterium individual locates; $\theta_m$ represents a mth dimension of the position where the bacterial colony locates; $\theta_m^i$ represents a mth dimension of the position where the ith bacterium individual locates; D represents the number of dimensions of a bacterial search environment;

$$\sum_{i=1}^{N}\left[h_{rep}\exp\left(-w_{rep}\sum_{m=1}^{D}(\theta_m - \theta_m^i)^2\right)\right]$$

represents repelling influence of the position where the ith bacterium individual locates on the bacterial colony; and $$\exp\left(-w_{rep}\sum_{m=1}^{D}(\theta_m - \theta_m^i)^2\right)$$

represents a coefficient of the repelling influence of the position where the ith bacterium locates on the bacterial colony.

According to an embodiment of the disclosure, wherein the feature information of the task comprises at least one of: Central Processing Unit (CPU), memory number, bandwidth, resource cost and reciprocal of a failure rate.

According to an embodiment of the disclosure, wherein classifying the task comprises: classifying the task according to a priority of the task and/or a judgment index for executing the task.

According to an embodiment of the disclosure, wherein the judgment index for executing the task is task completion time, network bandwidth, resource cost or a reliability parameter.

In order to solve the problem, a system for scheduling a task in cloud computing is provided, comprising: a user task information group processing component, configured to parameterize feature information of the task; a task classifying component, configured to classify the task; a resource allocating and scheduling component, configured to make a computation through a Bacteria Foraging Optimization Algorithm (BFOA) according to a classification result to obtain a best working node; and a node management component, configured to deploy the task to the best working node and execute the task by the best working node.

According to an embodiment of the disclosure, wherein the resource allocating and scheduling component makes the computation through the BFOA according to the classification result to obtain the best working node, which comprises: the parameterized feature information of the task is encoded according to the classification result to obtain encoded feature information; N working nodes are selected to form an initial bacterial colony, wherein the N working nodes selected serve as bacterial individual i of the initial bacterial colony, where $1 \le i \le N$; the encoded feature information corresponding to each bacterial individual are respectively decoded according to an algorithm decoder library; a fitness value of the each bacterial individual is computed; a taxis operation is performed on the each bacterial individual; a duplication operation is performed on the each bacterial individual; a migration operation is performed on the each bacterial individual; whether a best bacterial individual obtained currently reaches a user expectation value is judged; based on that the best bacterial individual obtained currently reaches the user expectation value, a working node corresponding to the best bacterial individual obtained currently is selected as the best working node; based on that the best bacterial individual obtained currently does not reach the user expectation value, a step of computing the fitness value of the each bacterial individual is returned.

According to an embodiment of the disclosure, wherein when the resource allocating and scheduling component performs the taxis operation on the each bacterial individual, the following process is further comprised: a quorum sensing operation is performed on the each bacterial individual.

According to an embodiment of the disclosure, wherein the resource allocating and scheduling component performs the taxis operation on the each bacterial individual, which comprises: a bacterial individual sequence $I_{c\_best}$ which is currently in a best position in the bacterial colony is determined, and a position and a fitness value of each bacterial individual in the bacterial individual sequence are stored; a bacterial individual sequence I to be searched for in the bacterial colony is determined; a serial number $J_{rand}$ is selected in the $I_{c\_best}$; the $I_{c\_best}$ is traversed to determine a position $P^J$ of the $J_{rand}$ in the $I_{c\_best}$; each bacterial individual in the I is traversed to find an initial position of the $J_{rand}$ in the I, and a serial number of the initial position of the $J_{rand}$ is replaced with the serial number of the $P^J$; a current position of a current bacterial individual is compared with a position of each bacterial individual in the $I_{c\_best}$ based on that the new current position of the current bacterial individual is better, the best bacterial individual is updated to the current bacterial individual, and a best fitness value of the bacterial colony is updated correspondingly; based on that the new current position of the current bacterial individual is not better, the current bacterial individual is got close to a position of the best bacterial individual in a next taxis operation.

According to an embodiment of the disclosure, wherein during performing the quorum sensing operation on the each bacterial individual, when the current bacterial individual is found in a standstill, the resource allocating and scheduling component reselects a direction to search for the bacterial individual again; or, stops searching for the current bacterial individual, and performs a searching operation for a next bacterial individual.

According to an embodiment of the disclosure, wherein the resource allocating and scheduling component updates the best bacterial individual to the current bacterial individual and updates the best fitness value of the bacterial colony correspondingly when the new current position of the current bacterial individual is better is determined, which comprises: when $J^i(j+1,k,l) > J_{best}(j,k,l)$, $\theta_{cc}^i(j+1,k,l) = \theta^i(j+1,k,l) + C_{cc} \times (\theta^b(j,k,l) - \theta^i(j,k,l))$, where, $\theta_{cc}^i(j+1,k,l)$ is an updated position of the current bacterial individual i after the quorum sensing operation; $J^i(j+1,k,l)$ is a fitness value of the current bacterial individual i; $\theta^b(j,k,l)$ and $J_{best}(j,k,l)$ are a position and a fitness value of bacterial individual b in a best position in a current bacterial colony respectively; and $C_{cc}$ is an attractive factor which determines a step at which the bacterial individual swims to a historical best position of the bacterial colony.

According to an embodiment of the disclosure, wherein the resource allocating and scheduling component gets the current bacterial individual close to the position of the best bacterial individual in the next taxis operation, which comprises:

$$V_{id}^{new} = \omega \cdot V_{id}^{old} + C_1 \cdot \phi_1 \cdot (\theta^b(j,k,l) - \theta_{i(d-1)}^{old}(j+1,k,l))$$

$$\theta_{id}^{new}(j+1,k,l) = \theta_{i(d-1)}^{old}(j+1,k,l) + V_{id}^{new}$$

where, $V_{id}^{new}$ represents a velocity of the current bacterial individual i after a dth taxis operation; $\omega$ is an inertia weight, which enables a bacterium to keep movement inertia and a trend of expanding a search space; $V_{id}^{old}$ represents a velocity of the current bacterial individual i after a (d−1)th taxis operation; $C_1$ is an acceleration constant; $\phi_1$ is a pseudo-random number uniformly distributed in an interval [0, 1]; $V_i$ is a velocity of the bacterial individual i; $\theta^b(j,k,l)$ is a position of bacterial individual b in a best position in the current bacterial colony; $\theta_{i(d-1)}^{old}(j+1,k,l)$ is a position of the current bacterial individual i after a (d−1)th taxis operation; and $\theta_{i(d-1)}^{new}(j+1,k,l)$ is a position of the current bacterial individual i after a dth taxis operation.

According to an embodiment of the disclosure, wherein the resource allocating and scheduling component performs the taxis operation on the current bacterial individual i, which comprises:

$$\theta_i(j+1,k,l) = \theta_i(j,k,l) + C(i)\Phi(j)$$

where, $C(i) > 0$, representing a step at which a bacteria swims forwards;

$$\Phi(j) = \frac{\Delta(i)}{\sqrt{\Delta^T(i)\Delta(i)}},$$

wherein $\Delta(i)$ represents a rotating vector, which is a number in an interval [−1, 1].

According to an embodiment of the disclosure, wherein the resource allocating and scheduling component performs the taxis operation on a current bacterial individual i, which comprises:

$$\theta_i(j+1,k,l) = \theta_i(j,k,l) + C(k,l)\Phi(j)$$

where, $C(k,l) = L_{init}/n^{k+l-1}$, $C(k,l)$ represents a taxis operation step of the bacterial individual during a kth duplication operation and a Ith migration operation; $L_{init}$ is an initial taxis step; n is a parameter for controlling a downward gradient of the step; and $$\Phi(j) = \frac{\Delta(i)}{\sqrt{\Delta^T(i)\Delta(i)}},$$

wherein $\Delta(i)$ represents a rotating vector, which is a number in an interval $[-1, 1]$.

According to an embodiment of the disclosure, wherein the resource allocating and scheduling component computes the fitness value of a current bacterial individual i after the taxis operation is performed on the current bacterial individual i, which comprises:

$$J^i(j+1, k, l) = J^i(j, k, l) + J_{cc}(\theta^i(j+1, k, l), P(j+1, k, l))$$

$$J_{cc}(\theta, P(j, k, l)) =$$

$$\sum_{i=1}^{N} J_{cc}(\theta, \theta^i(j, k, l)) = \sum_{i=1}^{N} \left[ -d_{attr} \exp\left( -w_{attr} \sum_{m=1}^{D} (\theta_m - \theta_m^i)^2 \right) \right] +$$

$$\sum_{i=1}^{N} \left[ h_{rep} \exp\left( -w_{rep} \sum_{m=1}^{D} (\theta_m - \theta_m^i)^2 \right) \right]$$

$$P(j, k, l) = \{\theta^i(j, k, l) \mid i = 1, 2, \ldots S\}$$

where, $J^i(j,k,l)$ is a fitness value of a bacteria individual i after a jth taxis operation, a kth duplication operation and a Ith migration operation; $J_{cc}(\theta^i(j+1,k,l),P(j+1,k,l))$ is an inter-individual sensitivity value of the bacteria individual i; $\theta^i(j+1,k,l)$ is an updated position of the bacteria individual i after a (d−1)th taxis operation; $P(j+1,k,l)$ is an individual position of the bacteria individual i in the bacterial colony after a (d−1)th taxis operation; $P(j,k,l)$ is an individual position of the bacteria individual i in the bacterial colony after a jth taxis operation; $d_{attr}$ and $w_{attr}$ represent a quantity and a releasing velocity of an attractive factor respectively; $h_{rep}$ and $w_{rep}$ represent a quantity and a releasing velocity of a repelling factor respectively;

$$\sum_{i=1}^{N} \left[ -d_{attr} \exp\left( -w_{attr} \sum_{m=1}^{D} (\theta_m - \theta_m^i)^2 \right) \right]$$

represents the cybotaxis influence, on the bacterial colony, brought by a position where a ith bacterium individual locates;

$$\exp\left(-w_{attr} \sum_{m=1}^{D} (\theta_m - \theta_m^i)^2\right)$$

represents a coefficient of the cybotaxis influence, on the bacterial colony, brought by the position where the ith bacterium individual locates;

$$\sum_{m=1}^{D} (\theta_m - \theta_m^i)^2$$

represents a variance of the position where the ith bacterium individual locates; $\theta_m$ represents a mth dimension of the position where the bacterial colony locates; $\theta_m^i$ represents a mth dimension of the position where the ith bacterium individual locates; D represents the number of dimensions of a bacterial search environment;

$$\sum_{i=1}^{N} \left[ h_{rep} \exp\left( -w_{rep} \sum_{m=1}^{D} (\theta_m - \theta_m^i)^2 \right) \right]$$

represents repelling influence of the position where the ith bacterium individual locates on the bacterial colony; and $$\exp\left(-w_{rep} \sum_{m=1}^{D} (\theta_m - \theta_m^i)^2\right)$$

represents a coefficient of the repelling influence of the position where the ith bacterium locates on the bacterial colony.

According to an embodiment of the disclosure, wherein the feature information of the task comprises at least one of the following: Central Processing Unit (CPU), memory number, bandwidth, resource cost and reciprocal of a failure rate.

According to an embodiment of the disclosure, wherein the task is classified comprise that: the task is classified according to a priority of the task and/or a judgment index for executing the task.

According to an embodiment of the disclosure, wherein the judgment index for executing the task is task completion time, network bandwidth, resource cost or a reliability parameter.

The disclosure has the following beneficial effects:

According to the method and the system for scheduling a task in cloud computing, the feature information of the task is parameterized; the task is classified; a computation is made through a BFOA according to the classification result to obtain the best working node; and the best working node is matched with the task. Obviously, in the disclosure, the BFOA is adopted to implement task scheduling and resource allocation in cloud computing, so that the cloud computing has the advantages of group, intelligent and parallel search, simplicity in escaping from a local minimum and the like for the scheduling of a user task group, is favourable for keeping the diversity of the task group in the cloud computing, can meet the requirement of the user better, and improves the degree of satisfaction of user experience.

DETAILED DESCRIPTION OF THE EMBODIMENTS

Figure 1:
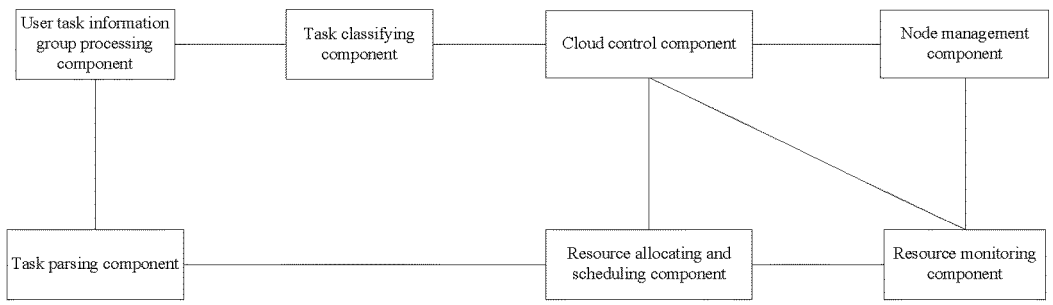
FIG. 1 is a diagram showing the structure of a system for scheduling a task in cloud computing in an embodiment of the disclosure.

The disclosure is further described below in combination with the accompanying drawings and the embodiments in detail.

For the better understanding of the disclosure, firstly, the BFOA is described below briefly.

The BFOA is a novel bionic random search algorithm, and its biological foundation is an intelligent behaviour of colibacillus in a foraging process. A control system of the colibacillus guides its behaviour in the foraging process, including taxis, duplication and migration (also called removal-dispersing), and evaluates the effect of each change of a state, so as to provide information for the next activity. Under the control of the system, the colibacillus may get close to a food source gradually. In a BFOA model, the pros and cons of the search algorithm are judged by a nutrition distribution function in a search process, and the state of bacteria in a search space corresponds to a solution to the problem which is optimized, namely, the fitness value of the optimized function. The algorithm has the advantages of group, intelligent and parallel search, simplicity in escaping from a local minimum and the like. Optionally:

Provided that the size of a bacterial colony is S, the position where a bacterial individual is located represents a candidate solution to a problem, the information of the bacterial individual i is represented with a D-dimension vector as:

$$\theta^i = [\theta_1^i, \theta_2^i, \ldots \theta_D^i], i=1,2,\ldots S$$

wherein $\theta^i(j,k,l)$ represents the position of bacterium individual i after the jth taxis operation, the kth duplication operation and the lth migration operation.

(1) Taxis Operation

The *colibacillus* switches between swimming and rotation to find food and avoid toxic substances in its whole life cycle. Simulation for this phenomenon is called taxis operation in the BFOA. The taxis operation enables the BFOA to have a local exploitation capability, and determines the progress direction of the algorithm, the detail level of a search in some area and the like. Each step of the taxis operation of the bacterial individual i is represented as follows:

$$\theta_i(j+1,k,l) = \theta_i(j,k,l) + C(i)\Phi(j)$$

where, $C(i)>0$, representing the step of swimming forwards of the bacterial individual;

$$\Phi(j) = \frac{\Delta(i)}{\sqrt{\Delta^T(i)\Delta(i)}},$$

wherein $\Delta(i)$ represents a rotating vector, which is a number in the interval [−1, 1].

(2) Duplication Operation

The biological evolution law is survival of the fittest. After foraging for a period of time, a part of bacteria with weak foraging capability may be eliminated naturally; and the remaining bacteria may breed to maintain the size of the colony. Simulation for this phenomenon in the BFOA is called duplication operation. A duplication operation process which adopts an elitism-preservation way is described below as an example.

In an original BFOA, the size of the colony may not be changed after the duplication operation. Provided that the number of the eliminated bacteria is Sr=S/2, the bacteria are sequenced according to the priority of their positions; and then, Sr bacteria sequenced at the back are eliminated; and each of the remaining Sr bacteria is self-duplicated to generate a new individual which is completely the same as itself, namely, the new individual is in the same position of the original bacterium; or, in other words, the number S of the bacterial colony after the duplication operation is not changed. Provided that the number of eliminated bacteria is Sr=S/2, firstly, the bacteria are sequenced according to the priority of their positions; and then, Sr bacteria sequenced at the back are eliminated, and the remaining bacteria are self-duplicated.

Of course, besides the elitism-preservation way, the duplication operation can further refer to other evolutionary algorithms during the design of the algorithm; and other various preservation ways may be adopted and mixed to carry out the duplication to improve the performance of the algorithm, such as a roulette method, a ($\mu+\lambda$) method, a tournament method, a steady method, a proportion transformation and sequencing method, and a sharing method.

(3) Migration Operation

A local area where a bacterial individual lives may change suddenly (such as the sudden rising of temperature) or changes gradually (such as the consumption of food), so that the bacterial colony living in the local area may die completely or migrate to a new local area together. Simulation for this phenomenon in the BFOA is called migration operation. The migration operation occurs at a certain probability. A probability ped is given, when a bacterial individual in a colony meets the probability at which the migration occurs, the bacterial individual dies out and generates a new individual in any position in a solution space randomly; and the new individual and the died individual may be in different positions, i.e., with different foraging capabilities. The new individual randomly generated in the migration operation may be more close to a global best solution, which is more favourable for the taxis operation to escape from a local best solution and find the global best solution. Namely, the migration operation enables the BFOA to have a random searching capability, which is favourable for keeping the diversity of the colony and reducing the phenomenon of premature convergence in the BFOA.

Please refer to FIG. 1, the system for scheduling a task in cloud computing in the embodiment includes:

a user task information group processing component which is configured to store the feature information of a task group and parameterize the feature information of the task, namely, encode the feature information of the task according to a certain encoding rule and record the encoded feature information to a task information database, wherein the feature information of the task can be represented by at least one piece of property information for measuring the resource computing capability and communication capability of a working node, such as CPU, memory number, bandwidth, resource cost and reciprocal of a failure rate;

a task parsing component which is configured to decode the feature information of the task corresponding to each target bacterial individual through an algorithm decoder library;

a task classifying component which is configured to classify the task, wherein the task classifying component can classify the task through the priority of each task and/or a judgment index for executing the each task; for example, when the each task is with a priority, the task can be classified according to the priority of each task, and when the each task is not with a priority, the task can be classified according to the judgment index for executing the each task; naturally, each task can also be classified according to the priority of each task and the judgment index executed by each task; and in the embodiment, the judgment index can be ensured by the combination of the priority of the task and the involved features of the Quality of Service (QoS) of a user, such as CPU, memory number, bandwidth, resource cost and reciprocal of a failure rate;

a resource allocating and scheduling component which is configured to make a computation through a BFOA according to the classification result to obtain the best working node;

a cloud control component which is the nerve centre of the whole system, is connected with the resource allocating and scheduling component, a resource monitoring component and a node management component respectively, and is configured to control and manage the whole cloud computing network, wherein, for example, each working node is notified to deploy a scheduled task to the local and feed the monitoring result of the resource monitoring component to the resource allocating and scheduling component and the like; and when the resource allocating and scheduling component fails to find the working nodes which is with the enough resource for the real-time migration of the task, a search failure message is fed back to the cloud control component; and when the task is migrated successfully in real time, a migration success message is fed back to the cloud control component;

a node management component which is configured to deploy a corresponding task to the best working node obtained by the resource allocating and scheduling component and execute the task through the best working node; and the resource monitoring component which is configured to monitor whether the allocated task is executed successfully, and feed the monitored information back to the cloud control component in real time to facilitate the cloud control component to notify the resource allocating and scheduling component to recycle resources or rematch the task with the working node resources.

Figure 2:
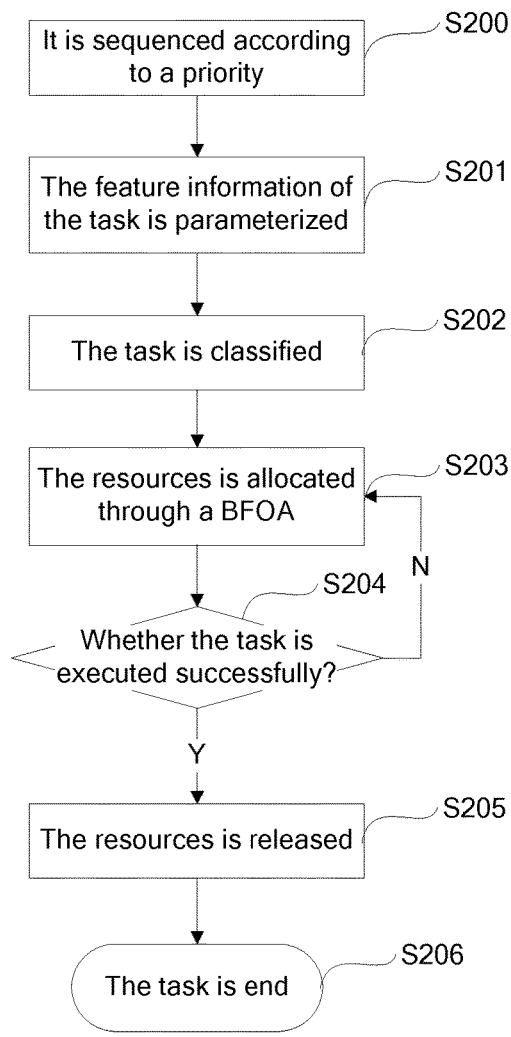
FIG. 2 is a diagram showing the flow of a method for scheduling a task in cloud computing in an embodiment of the disclosure.

Based on the system above, the disclosure is further described below in combination with a complete task scheduling and allocating flow. Provided that the number of a task group of a user is M, with reference to FIG. 2, a method for scheduling a task in cloud computing includes:

Step 201: The feature information of the task is parameterized.

Step 202: The task is classified.

Step 203: The best working node is obtained by computation through a BFOA according to the classification result; and the task is executed through the best working node.

Before Step 201, when it is judged that each task is with a priority, the method may further include Step 200: the task of the user is sequenced according to the priority. After Step 203, the method may further include: the allocated task is monitored and resources are recycled according to the monitoring result or Step 203 is re-executed to re-allocate working node resources, namely Steps 204 to 206 in FIG. 2. The Steps are described below in combination with specific flows respectively in detail.

Step 201: The feature information of the task is parameterized, in an optional manner, the feature information of the task is encoded according to a certain encoding rule and is recorded to a task information database; according to the characteristics of a cloud computing model, the feature information of the task in the embodiment can be represented by at least one piece of property information for measuring the resource computing capability and communication capability of a working node, such as CPU, memory number, bandwidth, resource cost and reciprocal of a failure rate.

Step 202: The task is classified, in an optional manner, the task can be classified according to its priority and/or a judgment index for executing the each task; the process of classifying the task according to the judgment index for executing the task is further described below, optionally, the following factors are considered:

The QoS, the bandwidth utilization rate of a cloud computing platform, fairness and the like are ensured according to the diversity and preference of cloud computing resource requirements of a user.

The judgment index in the embodiment can be ensured by the combination of the priority of the task and the involved features for ensuring the Quality of Service (QoS) of a user, such as CPU, memory number, bandwidth, resource cost and reciprocal of a failure rate, and can specifically include a task completion time, a network bandwidth, a resource cost or a reliability parameter, optionally as follows:

Provided that the feature set of resources $VM_i$ of working node i of a virtual machine is:

$$R_i = \{r_{i1}, r_{i2}, r_{i3}, r_{i4}, r_{im}\}, m \in [1,5]$$

where, $r_{im}$ represents a K-dimension diagonal matrix, representing a piece of property information for measuring the resource computing capability and communication capability, such as a CPU, a memory number, a bandwidth, a resource cost and a reciprocal of a failure rate.

The performance description matrix vector of working node resources $VM_i$ is:

$$VM_i = \{Q_{i1}, Q_{i2}, Q_{i3}, Q_{i4}, Q_{im}\}, m \in [1,5]$$

where, $Q_{im}$ represents a feature value corresponding to $r_{im}$.

The judgment index for executing the task may include task completion time, network bandwidth, resource cost, reliability parameter and the like; when it is the task completion time, the description of the judgment index includes start time, total completion time, ending time and the like, and the total completion time of the task is taken as the judgment index when in use.

Generally, an ordinary expected vector of an nth type task can be described as follows:

$$E_n = \{e_{n1}, e_{n2}, e_{n3}, e_{n4}, e_{nm}\}, m \in [1,5] \qquad (8)$$

where, $e_{nm}$ represents an ordinary expectation of the CPU, memory, bandwidth and the like respectively, and satisfies $$\sum_{j=1}^{m} e_{nj} = 1.$$

The task can be classified optionally by some typical clustering algorithms, such as a C means classification and K neighbour classification.

Figure 3:
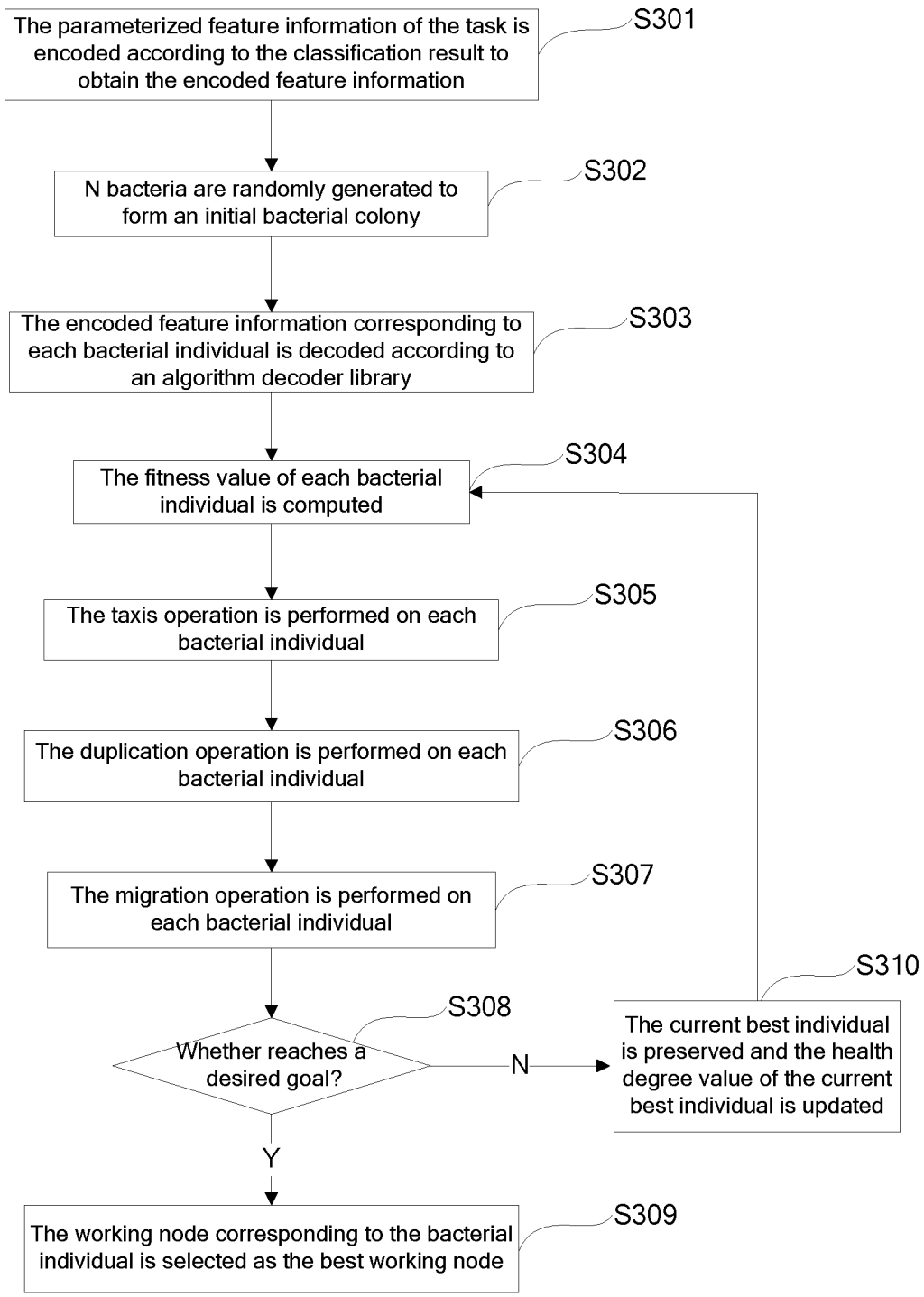
FIG. 3 is a diagram showing the flow of a BFOA in an embodiment of the disclosure.

Step 203: Please refer to FIG. 3, the best working node is obtained by computation through a BFOA according to the classification result.

Step 301: The parameterized feature information of the task is encoded according to the classification result to obtain the encoded feature information, wherein the encoding way can be any way of a binary encoding way, a real encoding way, an ordered list encoding way, an ordinary data structure encoding way.

Step 302: N working nodes are selected to form an initial bacterial colony as bacterial individuals i, $1 \leq i \leq N$; the scale N of the bacterial colony affects the performance of the BFOA efficiency. The computing velocity of the BFOA is high when the scale of the colony is small; but the optimized performance of the algorithm may be affected due to the reduction of diversity of the colony; and when the scale of the colony is large, the individuals are distributed to more areas when initialized, so that the probability of getting close to the best solution is higher. In other words, the larger the scale of the colony is, the higher of the diversity the individual in the colony is, and more easily the algorithm can escape from a local minimum. However, when the scale of the colony is too large, the computing workload of the algorithm may increase and the convergence of the algorithm may slow down. In the embodiment, N working nodes can be selected randomly based on the classification result of the task, the actual condition of each current working node and the number of the current task in the task group; and the value of the N can be the number of the current task in the task group or the number of working node determined by selecting one or more tasks in the task group. Namely, in the embodiment, all the tasks in the task group can be scheduled at the same time, or, one or more tasks in the task group can be scheduled in one time.

Step 303: The encoded feature information corresponding to each bacterial individual is decoded according to an algorithm decoder library.

Step 304: The fitness value of each bacterial individual is computed; in the embodiment, the fitness value of the current bacterial individual i ($1 \leq i \leq N$) is computed after the taxis operation, optionally as follows:

$$J^i(j+1,k,l) = J^i(j,k,l) + J_{cc}(\theta^i(j+1,k,l), P(j+1,k,l))$$

$$J_{cc}(\theta, P(j,k,l)) =$$

$$\sum_{i=1}^{N} J_{cc}(\theta, \theta^i(j,k,l)) = \sum_{i=1}^{N}\left[-d_{attr}\exp\left(-w_{attr}\sum_{m=1}^{D}(\theta_m - \theta_m^i)^2\right)\right] +$$

$$\sum_{i=1}^{N}\left[h_{rep}\exp\left(-w_{rep}\sum_{m=1}^{D}(\theta_m - \theta_m^i)^2\right)\right]$$

$$P(j,k,l) = \{\theta^i(j,k,l) | i = 1, 2, \ldots S\}$$

where, $J^i(j,k,l)$ is the fitness value of the bacteria individual i after the jth taxis operation, the kth duplication operation and the lth migration operation; $J_{cc}(\theta^i(j+1,k,l), P(j+1,k,l))$ is an inter-individual sensitivity value of the bacteria individual i; $\theta^i(j+1,k,l)$ is an updated position of the bacteria individual i after the (d−1)th taxis operation; $P(j+1,k,l)$ is an individual position of the bacteria individual i after the (d−1)th taxis operation in the bacterial colony;

$P(j,k,l)$ is an individual position of the bacteria individual i subjected to the jth taxis operation in the bacterial colony; $d_{attr}$ and $w_{attr}$ represent the quantity and the releasing velocity of an attractive factor respectively; $h_{rep}$ and $w_{rep}$ represent the quantity and the releasing velocity of a repelling factor respectively;

$$\sum_{i=1}^{N}\left[-d_{attr}\exp\left(-w_{attr}\sum_{m=1}^{D}(\theta_m - \theta_m^i)^2\right)\right]$$

represents the cybotaxis influence of the position where the ith bacterium individual is located on the bacterial colony;

$$\exp\left(-w_{attr}\sum_{m=1}^{D}(\theta_m - \theta_m^i)^2\right)$$

represents a coefficient of the cybotaxis influence of the position where the ith bacterium individual is located on the bacterial colony;

$$\sum_{m=1}^{D}(\theta_m - \theta_m^i)^2$$

represents a variance of the position where the ith bacterium individual is located; $\theta_m$ represents the mth dimension of the position where the bacterial colony is located; $\theta_m^i$ represents the mth dimension of the position where the ith bacterium individual is located; D represents the number of the dimension of a bacterial search environment;

$$\sum_{i=1}^{N}\left[h_{rep}\exp\left(-w_{rep}\sum_{m=1}^{D}(\theta_m - \theta_m^i)^2\right)\right]$$

represents the repelling influence of the position where the ith bacterium individual is located on the bacterial colony; and $$\exp\left(-w_{rep}\sum_{m=1}^{D}(\theta_m - \theta_m^i)^2\right)$$

represents a coefficient of the repelling influence of the position where the ith bacterium is located on the bacterial colony.

Figure 4:
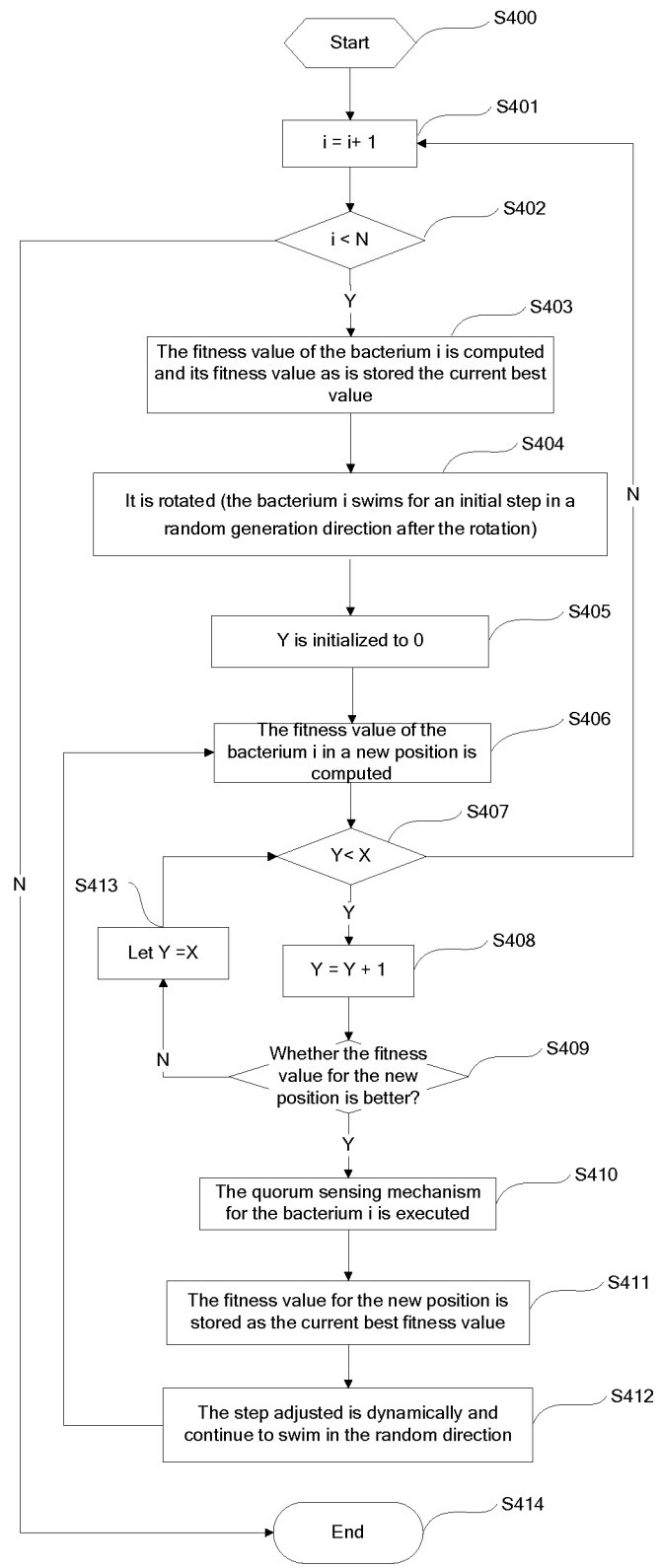
FIG. 4 is a flowchart showing taxis operation in a BFOA in an embodiment of the disclosure.

Step 305: The taxis operation is performed on the each bacterial individual, with specific flow as shown in FIG. 4:

The taxis operation is performed on the current bacterial individual i, specifically as follows:

$$\theta_i(j+1,k,l) = \theta_i(j,k,l) + C(i)\Phi(j)$$

where, $C(i) > 0$, representing the step of swimming forwards of bacteria;

$$\Phi(j) = \frac{\Delta(i)}{\sqrt{\Delta^T(i)\Delta(i)}},$$

wherein Δ(i) represents a rotating vector, which is a number in the interval [−1, 1].

In an embodiment, to further improve a search velocity, a global search capability in early optimization and a local search capability in later optimization are improved, the current bacterial individual i is subjected to taxis operation in the following ways:

$$\theta_i(j+1,k,l)=\theta_i(j,k,l)+C(k,l)\Phi(j)$$

where, $C(k,l)=L_{init}/n^{k+l-1}$, $C(k,l)$ represents the taxis operation step of the bacterial individual during the kth duplication operation and lth migration operation; $L_{init}$ is an initial taxis step; n is a parameter for controlling the downward gradient of the step; and $$\Phi(j) = \frac{\Delta(i)}{\sqrt{\Delta^T(i)\Delta(i)}},$$

wherein Δ(i) represents a rotating vector, which is a number in the interval [−1, 1].

The current bacterial individual i is subjected to taxis operation, optionally as follows:

Step 400: Start.

Step 401 and Step 402: The bacterial individual i is updated to determine that it is an individual in the bacterial colony.

Step 403: The fitness value of the bacterial individual i is computed, and is stored as the current best value.

Step 404: The bacterial individual i is rotated to randomly generate an initial step of swimming in the direction;

Step 405: The computing value Y is initialized to 0.

Step 406: The fitness value of the bacterial individual i in a new position is computed.

Step 407: Whether Y is less than the maximum step number X in the direction is judged, when Y is less than the maximum step number X in the direction, Step 408 is executed; and when Y is not less than the maximum step number X in the direction, Step 401 is executed.

Step 408: Y is updated to Y+1.

Step 409: Whether the fitness value for the new position is better is judged; when the fitness value for the new position is better, Step 409 is executed; and when the fitness value for the new position is not better, Step 413 is executed.

Step 410: The quorum sensing operation is performed on the each bacterial individual.

Step 411: The fitness value for the new position is stored as the best fitness value.

Step 412: The Step is adjusted, optionally, the step can be adjusted dynamically and swimming is continued in the random direction, and Step 406 is executed.

Step 413: Y is updated to X, and Step 407 is executed.

Step 414: End.

An inter-individual sensing mechanism is adopted when a solution space is searched by an original BFOA. Thus, when a task individual is subjected to taxis operation, the sensing value of the task can be added to the fitness value; this inter-individual sensing mechanism is favourable for keeping the diversity of the task group in the cloud group, and increases the probability of escaping from the local optimum of the task group; whereas, the approximately best task individual may be dispersed to slow down optimization process. Many task individuals are allocated to be around the global best resources, whereas, due to the increase of the task individuals, the concentration of the repelling factors generated in the area may rise, and the task individual in the best position may be expelled out of the best area, so that the accuracy is reduced. Therefore, in the taxis operation process of each bacterial individual i, Cell-To-Swarm (CTS) is further performed on the bacterial individual before the fitness value of the new position is stored as the best fitness value; and the bacterial individual senses the environment value around to test whether a bacterium is in the best position in the bacterial colony. Namely, in the quorum sensing mechanism in the embodiment, it is allowed that the bacterial individual can guide own swimming route according to the experience of companions; this conviction attraction mechanism accelerates the global search velocity in the solution space, is favourable for the bacterial individual to escape from the local optimum and prevents the bacteria from escaping from the global best area.

Step 410: The process of performing CTS on the bacterial individual is as follows:

Step 4101: A bacterial individual sequence $I_{c\_best}$ in the best position now in the bacterial colony is determined, its position and fitness value are stored.

Step 4102: The bacterial individual sequence I to be searched for in the bacterial colony is determined.

Step 4103: In the $I_{c\_best}$, a serial number $J_{rand}$ is selected.

Step 4104: $I_{c\_best}$ is traversed, and the position P' of the $J_{rand}$ in the $I_{c\_best}$ is determined.

Step 4105: Each bacterial individual in I is traversed to find the initial position of $J_{rand}$ in I and the serial number of the initial position is replaced with the serial number of P'.

Step 4106: The current position of the current bacterial individual is evaluated based on the individual, optionally, the current position of the current bacterial individual is evaluated based on the individual by computing the fitness value of the individual, so as to adjust the direction of the individual, change the step, and prepare for the forwards movement of the quorum sensing.

Step 4107: The current position of the current bacterial individual is compared with the position of the bacterial individual in $I_{c\_best}$, when the new position of the current bacterial individual is better, the best bacterial individual is updated to the current bacterial individual, and the best fitness value of the bacterial colony is updated correspondingly; otherwise, the current bacterial individual gets close to the best bacterial individual in the next taxis operation.

Step 4108: In the quorum sensing operation process of the bacterial individual i, when the current bacterial individual is found in a standstill, a direction is re-selected to search for the bacterial individual again; or, the next bacterial individual instead of the current bacterial individual is searched.

In the quorum sensing operation process of each bacterial individual i, the bacterial individual senses the environment around and tests whether a bacterium is in the best position in the bacterial colony. When a bacterium is in the best position in the bacterial colon, its position is stored, and when bacterium is not in the best position in the bacterial colon, its current position is stored. In the next taxis operation, the bacterium gets close to the best bacterial individual each time moving to the new position.

Optionally, in Step 4107, the step that the best bacterial individual is updated to the current bacterial individual, and the best fitness value of the bacterial colony is updated correspondingly when the new position of the current bacterial individual is better may include:

if $$J^i(j+1,k,l) > J_{best}(j,k,l),$$

$$\theta_{cc}^i(j+1,k,l) = \theta^i(j+1,k,l) + C_{cc} \times (\theta^b(j,k,l) - \theta^i(j,k,l))$$

where, $\theta_{cc}^i(j+1,k,l)$ is the updated position of the current bacterial individual i subjected to quorum sensing operation; $J^i(j+1,k,l)$ is the fitness value of the current bacterial individual I; $\theta^b(j,k,l)$ and $J_{best}(j,k,l)$ are the position and the fitness value of the bacterial individual b in the best position in the current bacterial colony; and $C^{cc}$ is an attractive factor which determines the step of swimming to the historical best position of the bacterial colony for the bacterial individual.

In Step 4107, the step that the current bacterial individual gets close to the best bacterial individual in the next taxis operation may include:

$$V_{id}^{new} = \omega \cdot V_{id}^{old} + C_1 \cdot \varphi_1 \cdot (\theta^b(j,k,l) - \theta_{i(d-1)}^{old}(j+1,k,l))$$

$$\theta_{id}^{new}(j+1,k,l) = \theta_{i(d-1)}^{old}(j+1,k,l) + V_{id}^{new}$$

where, $V_{id}^{new}$ represents the velocity of the current bacterial individual i subjected to the dth taxis operation; $\omega$ is an inertia weight, which enables the bacteria to keep movement inertia and a trend of expanding a search space; $V_{id}^{old}$ represents the velocity of the current bacterial individual i subjected to the (d−1)th taxis operation; $C_1$ is an acceleration constant; $\varphi_1$ is a pseudo-random number uniformly distributed in the interval [0, 1]; $V_i$ is the velocity of the bacterial individual i; $\theta^b(j,k,l)$ is the position of the bacterial individual b in the best position in the current bacterial colony; $\theta_{i(d-1)}^{old}(j+1,k,l)$ is the position of the current bacterial individual i subjected to the (d−1)th taxis operation; and $\theta_{id}^{new}(j+1,k,l)$ is the position of current bacterial individual i subjected to the dth taxis operation.

Figure 5:
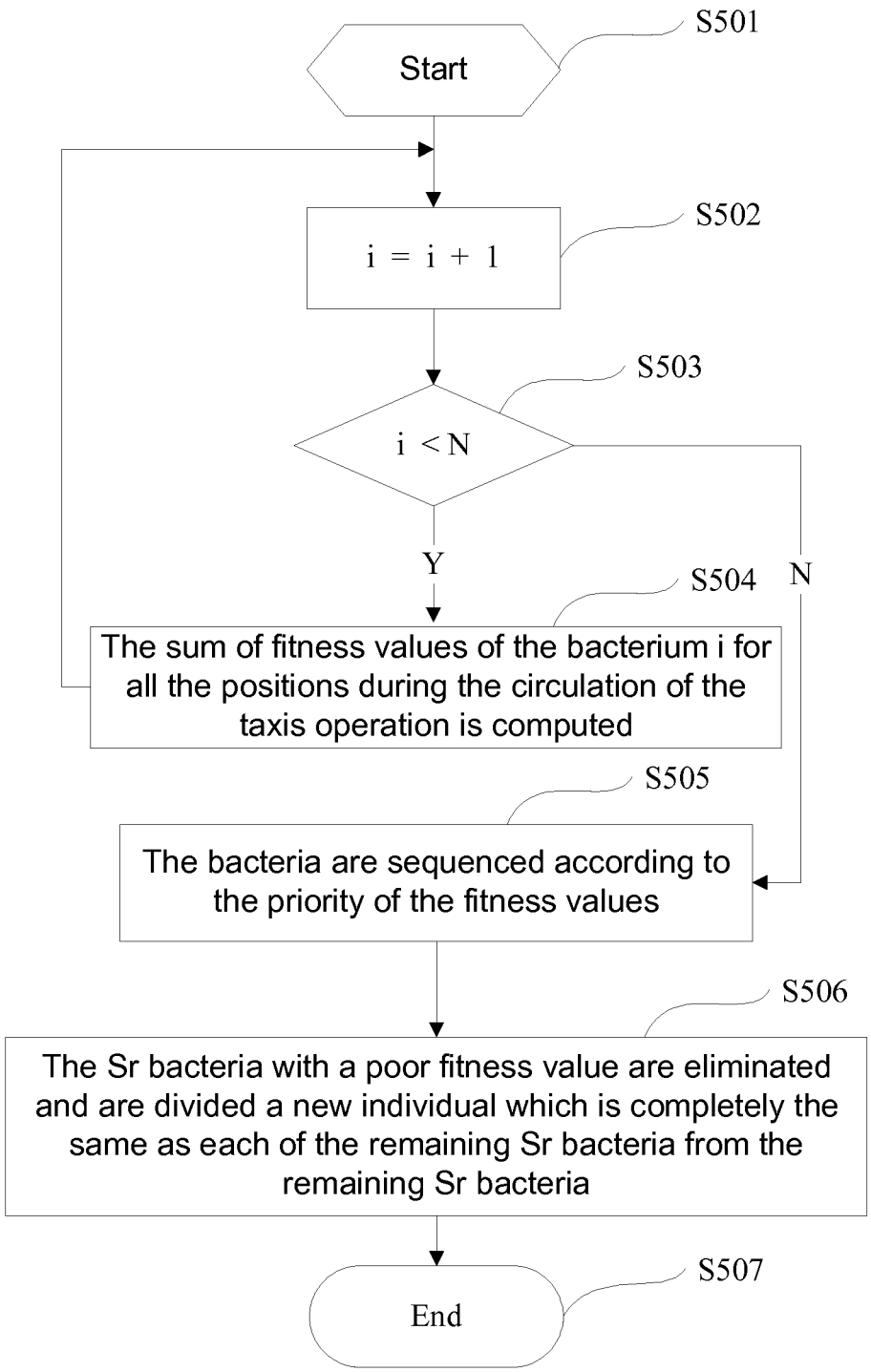
FIG. 5 is a flowchart showing duplication operation in a BFOA in an embodiment of the disclosure.

Step 306: Each bacterial individual is subjected to the bacterial duplication operation. The duplication operation is described here with an elitism-preservation duplication method as an example, with flow shown in FIG. 5:

Step 500: Start.

Step 501: The current bacterial individual i is updated.

Step 502: Whether the current bacterial individual i belongs to a bacterial colony is judged; when the current bacterial individual i belongs to a bacterial colony, Step 503 is executed; when the current bacterial individual i does not belong to a bacterial colony, Step 504 is executed.

Step 503: The sum of fitness values of all the positions through which the current bacterial individual i passes in the last taxis operation circulation is computed.

Step 504: The bacteria individual are sequenced according to the priority of the fitness values.

Step 505: Sr bacteria individual with a poor fitness value are eliminated, and each of the remaining Sr bacteria is divided into a new individual which is completely the same as itself.

Step 506: End.

Step 307: Each bacterial individual is subjected to migration operation, wherein the migration operation occurs according to a certain probability. A probability ped is given, when a bacterial individual in the colony meets an probability at which the migration occurs, the bacterial individual dies out and generates a new individual in any position in a solution space randomly; and the new individual and the died individual may be in different positions, i.e., different foraging capabilities. The new individual generated randomly in the migration operation may get more close to the global best solution, which is more favourable for the taxis operation to escape from a local best solution and find the global best solution.

Figure 6:
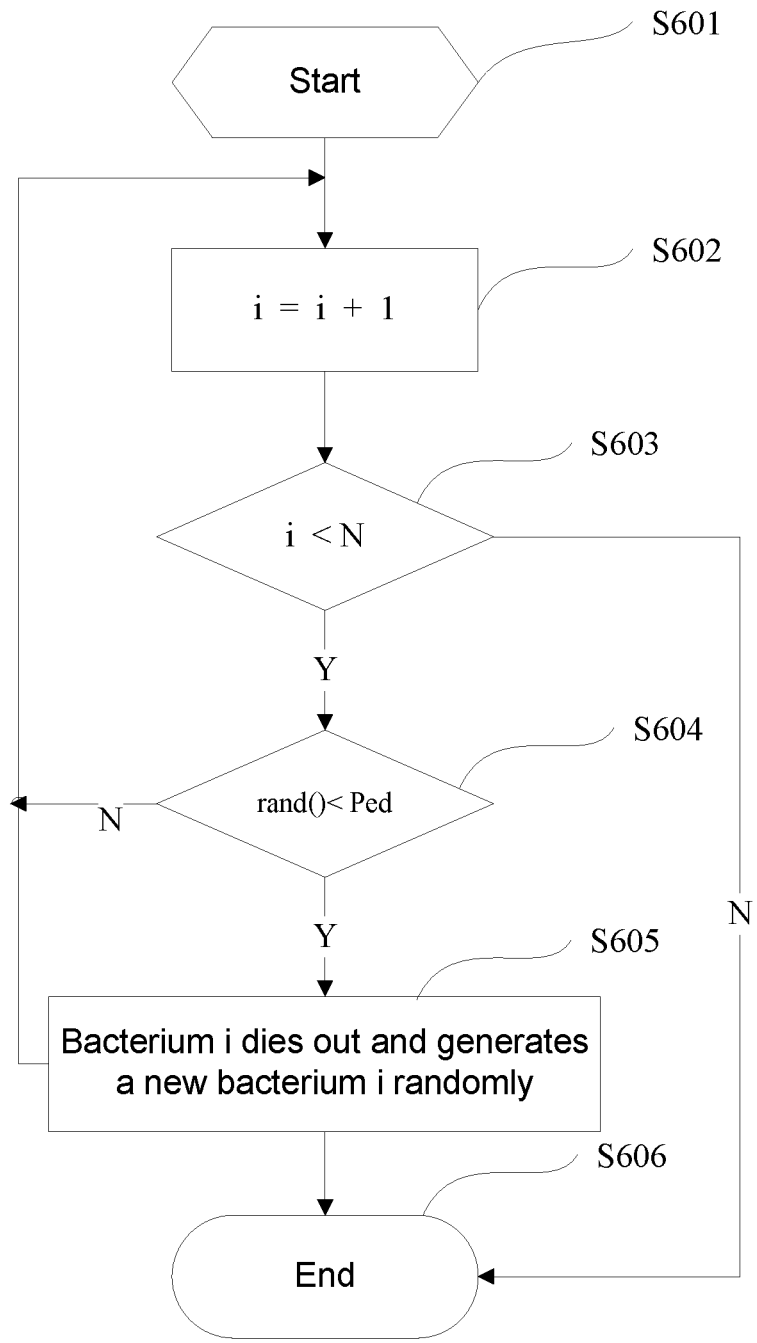
FIG. 6 is a flowchart showing migration operation in a BFOA in an embodiment of the disclosure.

Provided that i=0 and rand( ) is a random number uniformly distributed in the interval [0, 1] in initial time, the specific flow is as shown in FIG. 6, including:

Step 600: Start.

Step 601: The current bacterial individual i is updated.

Step 602: Whether the current bacterial individual i belongs to a bacterial colony is judged; when the current bacterial individual i belongs to a bacterial colony, Step 603 is executed; when the current bacterial individual i does not belong to a bacterial colony, Step 605 is executed.

Step 603: Whether rand( ) is less than ped is judged, when rand( ) is less than ped, Step 604 is executed, when rand( ) is not less than ped, Step 601 is executed.

Step 604: The current bacterial individual i dies out to generate a new bacteria individual i randomly, and Step 601 is executed.

Step 605: End.

Step 308: Whether the current best bacterial individual meets the user expectation value is judged; when the current best bacterial individual meets the user expectation value, Step 309 is executed; when the current best bacterial individual does not meet the user expectation value, Step 310 is executed.

Step 309: A working node corresponding to the bacterial individual is selected as the best working node.

Step 310: The current best individual is preserved, the fitness value is updated and Step 304 is re-executed.

Obviously, in the disclosure, the BFOA is adopted to implement task scheduling and resource allocation in cloud computing, so that the cloud computing has the advantages of group, intelligent and parallel search, simplicity in jumping off a local minimum and the like for the scheduling of a user task group, is favourable for keeping the diversity of the task group in the cloud computing, can meet the requirement of the user better, and improves the degree of satisfaction of user experience.

Furthermore, during the taxis operation of the bacterial individual, the swimming step of the bacterium is adjusted to a dynamic value, which can improve the global search capability during the early optimization and the local search capability during the later optimization, and is favourable for increasing the efficiency of cloud computing and the utilization rate of resources.

In addition, in the taxis operation process of each bacterial individual i, the bacterial individual i is further subjected to quorum sensing operation in which the bacterial individual senses the environment around and tests whether a bacterium is in the best position in the bacterial colony. Namely, in the quorum sensing mechanism in the embodiment, it is allowed the bacterial individual guide own swimming route according to the experience of companions; this conviction attraction mechanism accelerates the global search velocity in the solution space, is favourable for the bacterial individual to escape from the local optimum, prevents the bacteria from escaping from the global best area and ensures that the best task is allocated to the working node with the highest efficiency to be executed.

The above are the further descriptions of the disclosure in combination with the specific embodiments, and it can be understood that the specific embodiments of the disclosure are only not limited to these description. Various simple derivations or replacements can be made by those skilled in the art within the concept of the disclosure and pertain to the scope of protection of the disclosure.

To sum up, the method and the system for scheduling the task in cloud computing provided by the embodiments of the disclosure have the following beneficial effects: the cloud computing has the advantages of group, intelligent and parallel search, simplicity in escaping from a local minimum and the like for the scheduling of a user task group, is favourable for keeping the diversity of the task group in the cloud computing, can meet the requirement of the user better and improves the degree of satisfaction of user experience.

What is claimed is:

1. A method for scheduling a task in cloud computing, comprising:
   parameterizing, by a cloud computing task scheduling system, feature information of the task, wherein the feature information comprises at least one of: Central Processing Unit (CPU), memory, bandwidth, resource cost and reciprocal of a failure rate;
   classifying, by the cloud computing task scheduling system, the task according to a priority of the task or a judgment index for executing the task, if the task has no priority;
   performing, by the cloud computing task scheduling system, a computation through a Bacteria Foraging Optimization Algorithm (BFOA) according to a classification result to determine a best working node; and
   executing the task by the best working node;
   wherein performing the computation through the BFOA algorithm according to the classification result to determine the best working node comprises:
   encoding the parameterized feature information of the task according to the classification result to obtain encoded feature information, and recording the encoded feature information of the task to a task information database;
   selecting N working nodes to form an initial bacterial colony, wherein each node of the N working nodes selected serve as bacterial individual i of the initial bacterial colony, where 1≤i≤N;
   decoding respectively the encoded feature information corresponding to each bacterial individual according to an algorithm decoder library;
   computing a fitness value of the each bacterial individual, wherein the fitness value for a current bacterial individual is computed after a taxis operation is performed on the current bacterial individual;
   performing a taxis operation on the each bacterial individual, wherein performing the taxis operation for a current bacterial individual comprises evaluating a current position of the current bacterial individual based on computing its fitness value, rotating the current bacterium individual to randomly generate an initial step of swimming, determining whether the fitness value of the new position is better, and when it is better, performing a quorum sensing operation on the each bacterial individual of the bacterial colony to allow the bacterial individual to sense the environment around to test whether the bacteria individual is in the best position in the bacterial colony;
   performing a duplication operation on the each bacterial individual, wherein performing the duplication operation comprises sequencing bacteria individuals according to priority of fitness values, eliminating half of the bacteria individuals of the bacterial colony having poor fitness values, and generating new bacteria individuals by duplicating the remaining bacteria individuals;
   performing a migration operation on the each bacterial individual in response to a bacterial individual of the bacterial colony satisfying a predefined migration probability, wherein performing migration operation comprises the bacterial individual dying out, and randomly generating a new bacteria individual in any position of a solution space, which may be more close to a global best solution and more favorable for the taxis operation to escape from a local best solution;
   determining whether a best bacterial individual obtained currently meets a user expectation value;
   in response to determining that the best bacterial individual obtained currently meets the user expectation value, selecting a working node corresponding to the best bacterial individual obtained currently as the best working node; and
   in response to determining that the best bacterial individual obtained currently not meeting the user expectation value, returning to a step of computing the fitness value of the each bacterial individual;
   wherein computing the fitness value of the current bacterial individual after the taxis operation is performed on the current bacterial individual i further comprises:

$$J^i(j+1,k,l) = J^i(j,k,l) + J_{cc}(\theta^i(j+1,k,l), P(j+1,k,l))$$

$$J_{cc}(\theta, P(j,k,l)) =$$

$$\sum_{i=1}^{N} J_{cc}(\theta, \theta^i(j,k,l)) = \sum_{i=1}^{N} \left[ -d_{attr}\exp(-w_{attr}\sum_{m=1}^{D}(\theta_m - \theta_m^i)^2) \right] +$$

$$\sum_{i=1}^{N} \left[ h_{rep}\exp(-w_{rep}\sum_{m=1}^{D}(\theta_m - \theta_m^i)^2) \right]$$

$$P(j,k,l) = \{\theta^i(j,k,l) | i = 1, 2, \ldots S\}$$

where, $J^i(j,k,l)$ is a fitness value of a bacteria individual i after a jth taxis operation, a kth duplication operation and lth migration operation;
$J_{cc}(\theta^i(j+1,k,l), P(j+1,k,l))$ is an inter-individual sensitivity value of the bacterial individual i; $\theta^i(j+1,k,l)$ is an updated position of the bacteria individual i after a (d−1)th taxis operation; $P(j+1,k,l)$ is an individual position of the bacteria individual i in the bacterial colony after a (d−1)th taxis operation; $P(j,k,l)$ is an individual position of the bacteria individual i in the bacterial colony after a jth taxis operation; $d_{attr}$ and $w_{attr}$ represent a quantity and a releasing velocity of an attractive factor respectively; $h_{rep}$ and $w_{rep}$ represent a quantity and a releasing velocity of a repelling factor respectively;

$$\sum_{i=1}^{N} \left[ -d_{attr}\exp(-w_{attr}\sum_{m=1}^{D}(\theta_m - \theta_m^i)^2) \right]$$

represents cybotaxis influence, on the bacterial colony, brought by a position where a ith bacterium individual locates;

$$\exp(-w_{attr}\sum_{m=1}^{D}(\theta_m - \theta_m^i)^2)$$

represents a coefficient of the cybotaxis influence, on the bacterial colony, brought by the position where the ith bacterium individual locates;

$$\sum_{m=1}^{D}(\theta_m - \theta_m^i)^2$$

represents a variance of the position where the ith bacterium_individual locates; $\theta_m$ represents a mth dimension of the position where the bacterial colony locates; $\theta_m^i$ represents a mth dimension of the position where the ith bacterium individual locates; D represents the number of dimensions of a bacterial search environment;

$$\sum_{i=1}^{N}\left[h_{rep}\exp(-w_{rep}\sum_{m=1}^{D}(\theta_m-\theta_m^i)^2)\right]$$

represents repelling influence of the position where the ith bacterium individual locates on the bacterial colony; and $$\exp(-w_{attr}\sum_{m=1}^{D}(\theta_m-\theta_m^i)^2)$$

represents a coefficient of the repelling influence of the position where the ith_bacterium locates on the bacterial colony.

2. The method according to claim 1, wherein performing the quorum sensing operation on the each bacterial individual comprises:
    determining a bacterial individual sequence $I_{c\_best}$ which is currently in a best position in the bacterial colony, storing a position and a fitness value of each bacterial individual in the bacterial individual sequence;
    determining a bacterial individual sequence I to be searched for in the bacterial colony;
    selecting a serial number $J_{rand}$ in the $I_{c\_best}$;
    traversing the $I_{c\_best}$ to determine a position $P^J$ of the $J_{rand}$ in the $I_{c\_best}$;
    traversing each bacterial individual in the I to find an initial position of the $J_{rand}$ in the I, and replacing a serial number of the initial position of the $J_{rand}$ with the serial number of the $P^J$;
    comparing a current position of a current bacterial individual with a position of each bacterial individual in the $I_{c\_best}$, based on that the new current position of the current bacterial individual is better, updating the best bacterial individual to the current bacterial individual, and updating a best fitness value of the bacterial colony correspondingly; based on that the new current position of the current bacterial individual is not better, moving toward a position of the best bacterial individual in a next taxis operation.

3. The method according to claim 2, wherein during performing the quorum sensing operation on the each bacterial individual, when the current bacterial individual is found in a standstill, reselecting a direction to search for the bacterial individual again; or, stopping searching for the current bacterial individual and performing a searching operation for a next bacterial individual.

4. The method according to claim 2, wherein updating the best bacterial individual to the current bacterial individual, and updating the best fitness value of the bacterial colony correspondingly when the new position of the current bacterial individual is better comprises:
    when $$J^i(j+1,k,l)>J_{best}(j,k,l)$$

$$\theta_{cc}^i(j+1,k,l)=\theta^i(j+1,k,l)+C_{cc}\times(\theta^b(j,k,l)-\theta^i(j,k,l))$$

where, $\theta_{cc}^i(j+1,k,l)$ is an updated position of the current bacterial individual i after the quorum sensing operation; $J^i(j+1,k,l)$ is a fitness value of the current bacterial individual i; $\theta^b(j,k,l)$ and $J_{best}(j,k,l)$ are respectively a position and a fitness value of bacterial individual b in a best position in a current bacterial colony; and $C_{cc}$ is an attractive factor which determines a step at which the bacterial individual swims to a historical best position of the bacterial colony.

5. The method according to claim 2, wherein moving toward the position of the best bacterial individual in the next taxis operation comprises:

$$V_{id}^{new}=\omega\cdot V_{id}^{old}+C_1\cdot\varphi_1\cdot(\theta^b(j,k,l)-\theta_{i(d-1)}^{old}(j+1,k,l))$$

$$\theta_{id}^{new}(j+1,k,l)=\theta_{i(d-1)}^{old}(j+1,k,l)+V_{id}^{new}$$

where, $V_{id}^{new}$ represents a velocity of the current bacterial individual i after a dth taxis operation; m is an inertia weight, which enables a bacteria to keep movement inertia and a trend of expanding a search space; $V_{id}^{old}$ represents a velocity of the current bacterial individual i after a (d−1)th taxis operation; $C_1$ is an acceleration constant; $\varphi_1$ is a pseudo-random number uniformly distributed in an interval [0, 1]; $V_i$ is a velocity of the bacterial individual i; $\theta^b(j,k,l)$ is a position of bacterial individual bacterial individual i after a (d−1)th taxis operation; and $\theta_{id}^{new}(j+1,k,l)$ is a position of the current bacteria individual i after the taxis operation.

6. The method according to claim 1, wherein performing the taxis operation on the current bacterial individual i comprises:

$$\theta_i(j+1,k,l)=\theta_i(j,k,l)+C(i)\Phi(j)$$

where, $C(i)>0$, representing a step at which a bacteria swims forwards;

$$\Phi(j)=\frac{\Delta(i)}{\sqrt{\Delta^T(i)\Delta(i)}}$$

wherein $\Delta(i)$ represents a rotating vector, which is a number in an interval [−1, 1]; or,
performing the taxis operation on the current bacterial individual i comprises:

$$\theta_i(j+1,k,l)=\theta_i(j,k,l)+C(k,l)\Phi(j)$$

where, $C(k,l)=L_{init}/n^{k+l-1}$, $C(k,l)$ represents a taxis operation step of the bacterial individual during a kth duplication operation and a lth migration operation; $L_{init}$ is an initial taxis step; n is a parameter for controlling a downward gradient of the step; and $$\Phi(j)=\frac{\Delta(i)}{\sqrt{\Delta^T(i)\Delta(i)}},$$

where $\Delta(i)$ represents a rotating vector, which is a number in an interval [−1, 1].

7. The method according to claim 1, wherein classifying the task comprises:
    classifying the task according to a priority of the task and/or a judgment index for executing the task, wherein the judgment index for executing the task is task completion time, network bandwidth, resource cost or a reliability parameter.

8. A system for scheduling a task in cloud computing, comprising:
   a hardware processor configured to execute program units stored on a memory, the program units comprising:
   a user task information group processing component, configured to parameterize feature information of the task, wherein the feature information comprises at least one of: Central Processing Unit (CPU), memory, bandwidth, resource cost and reciprocal of a failure rate;
   a task classifying component configured to classify the task according to a priority of the task or a judgment index for executing the task, if the task has no priority;
   a resource allocating and scheduling component configured to perform a computation through a Bacteria Foraging Optimization Algorithm (BFOA) according to a classification result to determine a best working node; and
   a node management component configured to deploy the task to the best working node and execute the task by the best working node;
   wherein the resource allocating and scheduling component performs the computation through the BFOA according to the classification result to determine the best working node, which comprises:
   the parameterized feature information of the task is encoded according to the classification result to obtain encoded feature information, and stored to a task information database;
   N working nodes are selected to form an initial bacterial colony, wherein each node of the N working nodes selected serve as bacterial individual i of the initial bacterial colony, where $1 \leq i \leq N$;
   the encoded feature information corresponding to each bacterial individual are respectively decoded according to an algorithm decoder library;
   a fitness value of the each bacterial individual is computed, wherein the fitness value for a current bacterial individual is computed after a taxis operation is performed on the current bacterial individual;
   a taxis operation is performed on the each bacterial individual, wherein the taxis operation for a current bacterial individual is performed by evaluating a current position of the current bacterial individual based on computing its fitness value, rotating the current bacterium individual to randomly generate an initial step of swimming, determining whether the fitness value of the new position is better, and when it is better, performing a quorum sensing operation on the each bacterial individual of the bacterial colony to allow the bacterial individual to sense the environment around to test whether the bacteria individual is in the best position in the bacterial colony;
   a duplication operation is performed on the each bacterial individual, wherein the duplication operation is performed by sequencing bacteria individuals according to priority of fitness values, eliminating half of the bacteria individuals of the bacteria colony having poor fitness values, and generating new bacteria individuals by duplicating the remaining bacteria individuals;
   a migration operation is performed on the each bacterial individual, wherein the migration operation is performed upon detection that a bacterial individual of the bacterial colony satisfies a predefined migration probability, and comprises the bacterial individual dying out, randomly generating a new bacteria individual in any position of a solution space, which is more close to a global best solution and more favorable for the taxis operation to escape from a local best solution;
   whether a best bacterial individual obtained currently reaches a user expectation value is determined;
   based on determination that the best bacterial individual obtained currently reaches the user expectation value, a working node corresponding to the best bacterial individual obtained currently is selected as the best working node;
   based on determination that the best bacterial individual obtained currently does not reach the user expectation value, a step of computing the fitness value of the each bacterial individual is returned;
   wherein the resource allocating and scheduling component computes the fitness value of a current bacterial individual i after the taxis operation is performed on the current bacterial individual i, which comprises:

$$J^i(j+1, k, l) = J^i(j, k, l) + J_{cc}(\theta^i(j+1, k, l), P(j+1, k, l))$$

$$J_{cc}(\theta, P(j, k, l)) =$$

$$\sum_{i=1}^{N} J_{cc}(\theta, \theta^i(j, k, l)) = \sum_{i=1}^{N}\left[-d_{attr}\exp(-w_{attr}\sum_{m=1}^{D}(\theta_m - \theta_m^i)^2)\right] +$$

$$\sum_{i=1}^{N}\left[h_{rep}\exp(-w_{rep}\sum_{m=1}^{D}(\theta_m - \theta_m^i)^2)\right]$$

$$P(j, k, l) = \{\theta^i(j, k, l) \mid i = 1, 2, \ldots S\}$$

where, $J^i(j,k,l)$ is a fitness value of a bacteria individual i after a jth taxis operation, a kth duplication operation and lth migration operation;
$J_{cc}(\theta^i(j+1,k,l), P(j+1,k,l))$ is an inter-individual sensitivity value of the bacterial individual i; $\theta^i(j+1,k,l)$ is an updated position of the bacteria individual i after a (d−1)th taxis operation;
$P(j+1,k,l)$ is an individual position of the bacteria individual i in the bacterial colony after a (d−1)th taxis operation; $P(j,k,l)$ is an individual position of the bacteria individual i in the bacterial colony after a jth taxis operation; $d_{attr}$ and $w_{attr}$, represent a quantity and a releasing velocity of an attractive factor respectively; $h_{rep}$ and $w_{rep}$ represent a quantity and a releasing velocity of a repelling factor respectively;

$$\sum_{i=1}^{N}\left[-d_{attr}\exp(-w_{attr}\sum_{m=1}^{D}(\theta_m - \theta_m^i)^2)\right]$$

represents cybotaxis influence, on the bacterial colony, brought by a position where a ith bacterium individual locates;

$$\exp(-w_{attr}\sum_{m=1}^{D}(\theta_m - \theta_m^i)^2)$$

represents a coefficient of the cybotaxis influence, on the bacterial colony, brought by the position where the ith bacterium individual locates;

$$\sum_{m=1}^{D} (\theta_m - \theta_m^i)^2$$

represents a variance of the position where the ith bacterium_individual locates; $\theta_m$ represents a mth dimension of the position where the bacterial colony locates; $\theta_m^i$ represents a mth dimension of the position where the ith bacterium individual locates; D represents the number of dimensions of a bacterial search environment;

$$\sum_{i=1}^{N} \left[ h_{rep} \exp(-w_{rep} \sum_{m=1}^{D} (\theta_m - \theta_m^i)^2) \right]$$

represents repelling influence of the position where the ith bacterium individual locates on the bacterial colony; and $$\exp(-w_{rep} \sum_{m=1}^{D} (\theta_m - \theta_m^i)^2)$$

represents a coefficient of the repelling influence of the position where the ith bacterium locates on the bacterial colony.

9. The system according to claim 8, wherein the resource allocating and scheduling component performs the taxis operation on the each bacterial individual, which comprises:
a bacterial individual sequence $I_{c\_best}$ which is currently in a best position in the bacterial colony is determined, and a position and a fitness value of each bacterial individual in the bacterial individual sequence are stored;
a bacterial individual sequence I to be searched for in the bacterial colony is determined;
a serial number $J_{rand}$ in the is selected in the $I_{c\_best}$;
the $I_{c\_best}$ is traversed to determine a position $P^J$ of the $J_{rand}$ in the $I_{c\_best}$;
each bacterial individual in the I is traversed to find an initial position of the $J_{rand}$ in the I, and a serial number of the initial position of the $J_{rand}$ is replaced with the serial number of the $P^J$;
a current position of a current bacterial individual is compared with a position of each bacterial individual in the $I_{c\_best}$, based on that the new current position of the current bacterial individual is better, the best bacterial individual is updated to the current bacterial individual, and a best fitness value of the bacterial colony is updated correspondingly; based on that the new current position of the current bacterial individual is not better, the current bacterial individual is got close to a position of the best bacterial individual in a next taxis operation.

10. The system according to claim 9, wherein during performing the quorum sensing operation on the each bacterial individual, when the current bacterial individual is found in a standstill, the resource allocating and scheduling component reselects a direction to search for the bacterial individual again; or, stops searching for the current bacterial individual, and performs a searching operation for a next bacterial individual.

11. The system according to claim 9, wherein the resource allocating and scheduling component updates the best bacterial individual to the current bacterial individual and updates the best fitness value of the bacterial colony correspondingly when the new current position of the current bacterial individual is better is determined, which comprises:
when $$J^i(j+1,k,l) > J_{best}(j,k,l)$$

$$\theta_{cc}^i(j+1,k,l) = \theta^i(j+1,k,l) + C_{cc} \times (\theta^b(j,k,l) - \theta^i(j,k,l))$$

where, $\theta_{cc}^i(j+1,k,l)$ is an updated position of the current bacterial individual i after the quorum sensing operation; $J^i(j+1,k,l)$ is a fitness value of the current bacterial individual i; $\theta^b(j,k,l)$ and $J_{best}(j,k,l)$ are a position and a fitness value of bacterial individual b in a best position in a current bacterial colony respectively; and $C_{cc}$ is an attractive factor which determines a step at which the bacterial individual swims to a historical best position of the bacterial colony.

12. The system according to claim 9, wherein the resource allocating and scheduling component gets the current bacterial individual close to the position of the best bacterial individual in the next taxis operation, which comprises:

$$V_{id}^{new} = \omega \cdot V_{id}^{old} + C_1 \cdot \varphi_1 \cdot (\theta^b(j,k,l) - \theta_{i(d-1)}^{old}(j+1,k,l))$$

$$\theta_{id}^{new}(j+1,k,l) = \theta_{i(d-1)}^{old}(j+1,k,l) + V_{id}^{new}$$

where, $V_{id}^{new}$ represents a velocity of the current bacterial individual i after a dth taxis operation; m is an inertia weight, which enables a bacteria to keep movement inertia and a trend of expanding a search space; $V_{id}^{old}$ represents a velocity of the current bacterial individual i after a (d−1)th taxis operation; $C_1$ is an acceleration constant; $\varphi_1$ is a pseudo-random number uniformly distributed in an interval [0, 1]; $V_i$ is a velocity of the bacterial individual i; $\theta^b(j,k,l)$ is a position of bacterial individual best position in the current bacteria colony; $\theta_{i(d-1)}^{old}(j+1,k,l)$ is a position of the current bacterial individual i after a (d−1)th taxis operation; and $\theta_{id}^{new}(j+1,k,l)$ is a position of the individual i after the taxis operation.

13. The system according to claim 8, wherein the resource allocating and scheduling component performs the taxis operation on the current bacterial individual i, which comprises:

$$\theta_i(j+1,k,l) = \theta_i(j,k,l) + C(i)\Phi(j)$$

where, $C(i) > 0$, representing a step at which a bacteria swims forwards;

$$\Phi(j) = \frac{\Delta(i)}{\sqrt{\Delta^T(i)\Delta(i)}}$$

wherein $\Delta(i)$ represents a rotating vector, which is a number in an interval [−1, 1]; or,
the resource allocating and scheduling component performs the taxis operation on a current bacterial individual i, which comprises:

$$\theta_i(j+1,k,l) = \theta_i(j,k,l) + C(k,l)\Phi(j)$$

where, $C(k,l) = L_{init}/n^{k+l-1}$, $C(k,l)$ represents a taxis operation step of the bacterial individual during a kth duplication operation and a 1th migration operation; $L_{init}$ is an initial taxis step; n is a parameter for controlling a downward gradient of the step; and $$\Phi(j) = \frac{\Delta(i)}{\sqrt{\Delta^T(i)\Delta(i)}},$$

where $\Delta(i)$ represents a rotating vector, which is a number in an interval $[-1, 1]$.

14. The system according to claim 8, wherein the task is classified comprise that: the task is classified according to a priority of the task and/or a judgment index for executing the task, wherein the judgment index for executing the task is task completion time, network bandwidth, resource cost or a reliability parameter.

* * * * *